(12) United States Patent
Minami et al.

(10) Patent No.: US 8,369,634 B2
(45) Date of Patent: Feb. 5, 2013

(54) IMAGE DECODER FOR HD PHOTO

(75) Inventors: Nobuhiro Minami, Osaka (JP); Yujiro Tani, Osaka (JP); Yusuke Mizuno, Osaka (JP); Hideki Daian, Osaka (JP); Masahiro Moriyama, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 733 days.

(21) Appl. No.: 12/572,878

(22) Filed: Oct. 2, 2009

(65) Prior Publication Data

US 2010/0111430 A1 May 6, 2010

(30) Foreign Application Priority Data

Nov. 4, 2008 (JP) ................. 2008-283763

(51) Int. Cl.
*G06K 9/36* (2006.01)
*G06K 9/46* (2006.01)
(52) U.S. Cl. ......... 382/238; 382/166; 382/233; 382/248
(58) Field of Classification Search .................. 382/166, 382/233, 234, 238, 248, 250; 708/203
See application file for complete search history.

(56) References Cited

U.S. PATENT DOCUMENTS

| | | | | |
|---|---|---|---|---|
| 2009/0240754 A1* | 9/2009 | Huang | ............. | 708/308 |
| 2009/0274382 A1* | 11/2009 | Lin et al. | ............. | 382/238 |
| 2009/0297054 A1* | 12/2009 | Regunathan et al. | ......... | 382/248 |

OTHER PUBLICATIONS

Sridhar et al. ("HD Photo: a new image coding technology for digital photography," Proc. SPIE, vol. 6696 (2007).*
Pan et al. ("Architecture design of full HD JPEG XR encoder for digital photography applications," IEEE Tran. Consumer Electronics, vol. 54, Issue 3, Aug. 2008, pp. 963-971).*
HD Photo—Photographic Still Image File Format, Device Porting Kit Specification, Nov. 7, 2006, 140 pages, URL: http://www.microsoft.com/downloads/details.aspx?FamilyID=285eeffd-d86c-48c3-ab93-3abd5ee7flce&displaylang=en.
Coding of Still Pictures—JBIG JPEG, Text of ISO/IEC CD 29199-2, ISO/IEC JTC 1/SC 29/WG1 N 4392, Dec. 19, 2007, 151 page.
Coding of Still Pictures—JBIG JPEG, Text of ISO/IEC FCD 29199-2 , ISO/IEC JTC 1/SC 29/WG1 N4739 (JPEG XR image coding—Specification), Sep. 14, 2008, 171 pages.

* cited by examiner

*Primary Examiner* — Yubin Hung
(74) *Attorney, Agent, or Firm* — Oblon, Spivak, McClelland, Maier & Neustadt, L.L.P.

(57) ABSTRACT

A sorting unit sorts a plurality of data sets of HP component having been processed by a decoding unit, selectively employing one of a first table corresponding to a first orientation of prediction and a second table corresponding to a second orientation of prediction in accordance with an orientation of prediction of HP component. The sorting unit includes an inverse prediction unit performing inverse prediction on data of LP component inputted from the decoding unit, a processing unit obtaining an orientation of prediction of HP component, based on the data of LP component after inverse prediction by the inverse prediction unit, and a selecting unit selecting one of the first and second tables, based on the orientation of prediction of HP component obtained by the processing unit.

14 Claims, 13 Drawing Sheets

|   | 0 | 1 | 2 |
|---|---|---|---|
| 3 | 4 | 5 | 6 |
| 7 | 8 | 9 | 10 |
| 11 | 12 | 13 | 14 |

TA

| index | 2 | 1 | 3 | 0 | 8 | 10 | 4 | 6 | 5 | 7 | 12 | 13 | 9 | 11 | 14 |
|-------|---|---|---|---|---|----|---|---|---|---|----|----|---|----|----|
| count | 60 | 42 | 41 | 34 | 34 | 30 | 28 | 27 | 27 | 24 | 20 | 16 | 10 | 8 | 6 |

| 0 | 1 | 2 | 3 | 4 | 5 | 6 | 7 | 8 | 9 | 10 | 11 | 12 | 13 | 14 |
|---|---|---|---|---|---|---|---|---|---|----|----|----|----|----|

| 2 | 1 | 3 | 0 | 8 | 10 | 4 | 6 | 5 | 7 | 12 | 13 | 9 | 11 | 14 |
|---|---|---|---|---|----|---|---|---|---|----|----|---|----|----|

IMAGE DECODER FOR HD PHOTO

CROSS-REFERENCE TO RELATED APPLICATIONS

This application claims priority to Japanese Patent Application No. 2008-283763. The entire disclosure of Japanese Patent Application No. 2008-283763 is hereby incorporated herein by reference.

BACKGROUND OF THE INVENTION

1. Field of the Invention

The present invention relates to an image processor, and more particularly, to a decoder for HD Photo.

2. Description of the Background Art

Microsoft Corporation has recently proposed HD Photo (or JPEG XR) as a still image file format that offers higher image quality than JPEG while requiring more simple circuit configuration and computation than JPEG 2000.

An encoder for HD Photo includes a color conversion unit, a pre-filter, a frequency transform unit, a quantization unit, a prediction unit, and an encoding unit. The frequency transform unit performs predetermined frequency transform (PCT) on an inputted pixel signal, so as to output frequency data (coefficient data) of highpass (hereinafter "HP"), lowpass (hereinafter "LP"), and direct current (hereinafter "DC") components. One macroblock having 16 pixels in column×16 pixels in row includes 240 sets of frequency data of HP component, 15 sets of frequency data of LP component, and 1 set of frequency data of DC component for each of luminance Y, chrominance U, and chrominance V.

The quantization unit discards lower (or less significant) data equivalent to the number of digits defined by a quantization coefficient in frequency data of each component inputted from the frequency transform unit, so as to output frequency data after quantization (HP, LP, and DC components).

The encoding unit splits the frequency data of each component inputted from the prediction unit into upper (or more significant) data (Normal Data) in an upper digit range and lower data (Flex Bits) in a lower digit range. Then the encoding unit performs entropy coding on the Normal Data of each component, and output the same, while outputting the Flex Bits of each component without entropy coding.

A decoder for HD Photo includes a color inverse conversion unit, a post-filter, a frequency inverse transform unit, a dequantization unit, an inverse prediction unit and a decoding unit. The decoder performs processing in reverse order to processing by the encoder, so as to decompress pixel signals from the coded frequency data.

The details of HD Photo are disclosed in, for example, "HD Photo—Photographic Still Image File Format", [online], 7 Nov. 2006, Microsoft Corporation, [searched in the Internet on 10 Oct. 2007], URL: http://www.microsoft.com/whdc/xps/hdphotodpk.mspx>. The details of JPEG XR are disclosed in, for example, "Coding of Still Pictures—JBIG JPEG", [online], 19 Dec. 2007, ISO/IEC JTC 1/SC 29/WG1 N 4392, [searched in the Internet on 4 Mar. 2008], <URL: http://www.itscj.ipsj.or.jp/sc29/open/29view/29n9026t.doc> or "Coding of Still Pictures—JBIG JPEG", [online], 14 Sep. 2008, ISO/IEC JTC 1/SC 29/WG1 N 4739, [searched in the Internet on 17 Sep. 2008], <URL:http://www.itscj.ipsj.or.jp/sc29/open/29view/29n9749t.doc>.

FIG. 14 is a block diagram showing a part of a configuration of a decoder for HD Photo. A data stream including a plurality of coded frequency data sets is inputted to processing units 501 and 502. The processing unit 501 decodes Normal Data. The processing unit 502 decodes Flex Bits. A processing unit 503 sorts (Adaptive Scan) 15 sets of data of LP component among data inputted from the processing unit 501. The processing unit 503 also sorts 15 sets of data of HP component among data inputted from the processing unit 501 on a block-by-block basis. Specifically, data is sorted into the order of decreasing frequency of appearance of nonzero data, employing a table showing frequency of appearance of nonzero data. For LP component, there is one table. For HP component, there are two tables, one employed when orientation of prediction of HP component in the macroblock is leftward (hereinafter, "leftward table"), and the other when upward (hereinafter, "upward table").

The data processed by the processing unit 503 is stored in a memory unit 504. The data processed by the processing unit 502 is stored in the memory unit 505.

A processing unit 506 perform sorting of plural blocks in each sub block, and joining of Normal Data and Flex Bits, on the data read from the memory units 504 and 505.

A processing unit 507 performs inverse prediction on the data inputted from the processing unit 506. The prediction value of DC component is selected from the value of DC component of a macroblock on the left, the value of DC component of a macroblock above, and the average value of the values of DC component of the macroblock on the left and one above, depending on whether or not an edge exist.

The prediction value of LP component is selected from the value of LP component of a macroblock on the left, the value of LP component of a macroblock above, and zero (i.e., prediction is not performed), depending on the orientation of prediction of DC component.

Here, prediction of LP component is performed only on specific data (for YUV444 color space, three sets of data of the top row and three sets of data of the leftmost column within a macroblock). The data necessary for prediction of LP component is stored in a memory unit 508.

The prediction value of HP component is selected from the value of HP component of a block on the left, the value of HP component of a block above, and zero, depending on the value of the above specific data of LP component. Similar to LP component, prediction of HP component is performed only on specific data (for YUV444 color space, three sets of data of the top row and three sets of data of the leftmost column within each block).

When the orientation of prediction of HP component is obtained in the processing unit 507, the processing unit 503 is notified of information on the orientation of prediction as data S100. Based on the data S100, the processing unit 503 selects one of the leftward and upward tables.

FIG. 15 is a timing diagram showing the operation of the configuration in FIG. 14. (A) denotes a period during which data is written to the memory units 504 and 505. (B) denotes a period during which inverse prediction is performed in the processing unit 507. FIG. 15 shows only operation regarding consecutive two macroblocks (0th and first macroblocks).

As indicated in FIG. 15, a time lag T100 occurs between when writing of data LP0 of LP component of the 0th macroblock is completed and when writing of data HP0Y of HP component of the 0th macroblock is started. Similarly, a time lag T101 occurs between when writing of data LP1 of LP component of the first macroblock is completed and when writing of data HP1Y of HP component of the first macroblock is started. This is because the processing unit 503 cannot select one of the leftward and upward tables, until the processing unit 507 completes inverse prediction on the data of LP component and the orientation of prediction of HP component is obtained.

As described above, according to the configuration in FIG. 14, a sorting unit in a preceding stage (processing unit 503) needs to wait for the orientation of prediction of HP component to be obtained in an inverse prediction unit in a subsequent stage (processing unit 507), to start to sort data of HP component. Thus processing of a decoder as a whole is prolonged due to waiting time in the sorting unit.

SUMMARY OF THE INVENTION

It is an object of the present invention to provide an image processor with reduced time required for decoding, by eliminating waiting time in a sorting unit.

According to a first aspect of the present invention, an image processor includes a decoding unit decoding first data of first frequency component and second data of second frequency component, the second data including a plurality of second data sets, a sorting unit sorting the plurality of second data sets having been processed by the decoding unit, selectively employing one of a first table indicating frequency of appearance of nonzero data corresponding to a first orientation of prediction and a second table indicating frequency of appearance of nonzero data corresponding to a second orientation of prediction in accordance with an orientation of prediction of the second data, and an inverse prediction unit performing inverse prediction on the first and second data having been processed by the sorting unit. Obtaining the orientation of prediction of the second data requires the first data after inverse prediction. The sorting unit includes a first processing unit performing inverse prediction on the first data inputted from the decoding unit, a second processing unit obtaining the orientation of prediction of the second data, based on the first data after inverse prediction by the first processing unit, and a third processing unit selecting one of the first and second tables, based on the orientation of prediction of the second data obtained by the second processing unit.

The sorting unit performs inverse prediction on the first data with the first processing unit provided in the sorting unit itself, and obtains the orientation of prediction of the second data with the second processing unit provided in the sorting unit itself. This enables the sorting unit to select one of the first and second tables based on the orientation of prediction of the second data obtained by the sorting unit itself, without waiting for the orientation of prediction of the second data to be obtained in the inverse prediction unit in the subsequent stage. This enables the sorting unit to start sorting the second data, without waiting for the orientation of prediction of the second data to be obtained in the inverse prediction unit in the subsequent stage. Consequently, waiting time in the sorting unit is eliminated, and thus time required for decoding is reduced.

Preferably in the image processor, inverse prediction of the first data requires information on the orientation of prediction of the first data, and the information is inputted from the inverse prediction unit to the first processing unit.

Information on the orientation of prediction of the first data is inputted from the inverse prediction unit to the first processing unit. Thus the sorting unit does not require a circuit for obtaining the orientation of prediction of the first data to be provided in itself. Consequently, circuit size of the sorting unit is reduced.

Preferably in the image processor, inverse prediction of the first data requires information on the orientation of prediction of the first data, and the sorting unit further includes a fourth processing unit obtaining the orientation of prediction of the first data.

The sorting unit obtains the orientation of prediction of the first data with the fourth processing unit provided in itself, instead of getting the information on the orientation of prediction of the first data from the inverse prediction unit. This enables the sorting unit to start inverse prediction of the first data, without waiting for the orientation of prediction of the first data to be obtained by the inverse prediction unit. Consequently, time required for decoding is reduced. Furthermore, there is no need for timing adjustment to obtain information on the orientation of prediction of the first data from the inverse prediction unit in the subsequent stage.

Preferably in the image processor, inverse prediction of the first data requires specific first data within a macroblock formerly processed by the sorting unit, and the sorting unit further includes a memory unit for storing the specific first data.

The sorting unit holds the specific first data within the formerly processed macroblock in the memory unit provided in itself, instead of getting the specific first data from the inverse prediction unit. This enables the sorting unit to start inverse prediction on the first data of the currently target macroblock, without waiting for the specific first data to be obtained in the inverse prediction unit. Consequently, time required for decoding is reduced. The formerly processed macroblock is an adjacent macroblock on the same row as the presently target macroblock. Thus sets of specific first data within the formerly processed macroblock are not too many in number (three sets for the data of lowpass component in HD Photo) to keep increase in the circuit size of the sorting unit caused by adding the memory unit to a minimum.

Preferably in the image processor, inverse prediction of the first data requires specific first data within a macroblock processed by the sorting unit before the formerly processed macroblock, and the specific first data is inputted from the inverse prediction unit to the first processing unit.

Specific first data necessary for inverse prediction in the sorting unit is inputted from the inverse prediction unit to the sorting unit. Thus the sorting unit does not require a memory unit for storing the specific first data to be provided in itself. Consequently, the circuit size of the sorting unit is reduced. Since the first specific data is the data of the macroblock processed by the sorting unit before the formerly processed macroblock, it has already been obtained in the inverse prediction unit. Thus the sorting unit can get the specific first data from the inverse prediction unit without waiting time.

According to a second aspect of the present invention, an image processor includes a decoding unit decoding first data of first frequency component and second data of second frequency component included in a data stream, the second data including a plurality of second data sets, a first sorting unit sorting the plurality of second data sets having been processed by the decoding unit, employing a first table indicating frequency of appearance of nonzero data corresponding to a first orientation of prediction, a second sorting unit sorting the plurality of second data sets having been processed by the decoding unit, employing a second table indicating frequency of appearance of nonzero data corresponding to a second orientation of prediction, concurrently with processing by the first sorting unit, and an inverse prediction unit performing inverse prediction on the first and second data. An orientation of prediction of the second data is obtained by inverse prediction on the first data by the inverse prediction unit. One of the first and second sorting units is selected based on the orientation of prediction of the second data. The second data processed by a selected one of the first and second sorting units is inputted to the inverse prediction unit.

The image processor includes the first sorting unit sorting employing the first table corresponding to the first orientation of prediction and the second sorting unit sorting employing the second table corresponding to the second orientation of prediction. Sorting by the first sorting unit and sorting by the second sorting unit are performed concurrently. When the orientation of prediction of the second data is later obtained by the inverse prediction unit, the correct one of the first and second sorting units is selected. This enables the first and second sorting units to start sorting, without waiting for the orientation of prediction of the second data to be obtained in the inverse prediction unit in the subsequent stage. Consequently, waiting time in the first and second sorting units is eliminated, and thus time required for decoding is reduced.

Preferably in the image processor, the decoding unit is notified of information on the orientation of prediction of the second data obtained by the inverse prediction unit and based on the information, determines a start position of decoding of a subsequent macroblock in the data stream.

The second data differs in data length, depending on the orientation of prediction of the second data in the currently target macroblock. That is, start position of decoding of the subsequently target macroblock in the data stream differs, depending on the orientation of prediction of the second data in the currently target macroblock. The decoding unit is notified of the information on the orientation of prediction of the second data obtained in the inverse prediction unit, and based on this information, determines the start position of decoding of a subsequent macroblock in the data stream. Thus the decoding unit can start decoding of the subsequent macroblock from an appropriate position in the data stream.

Waiting time in a sorting unit is eliminated, and thus time required for decoding is reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
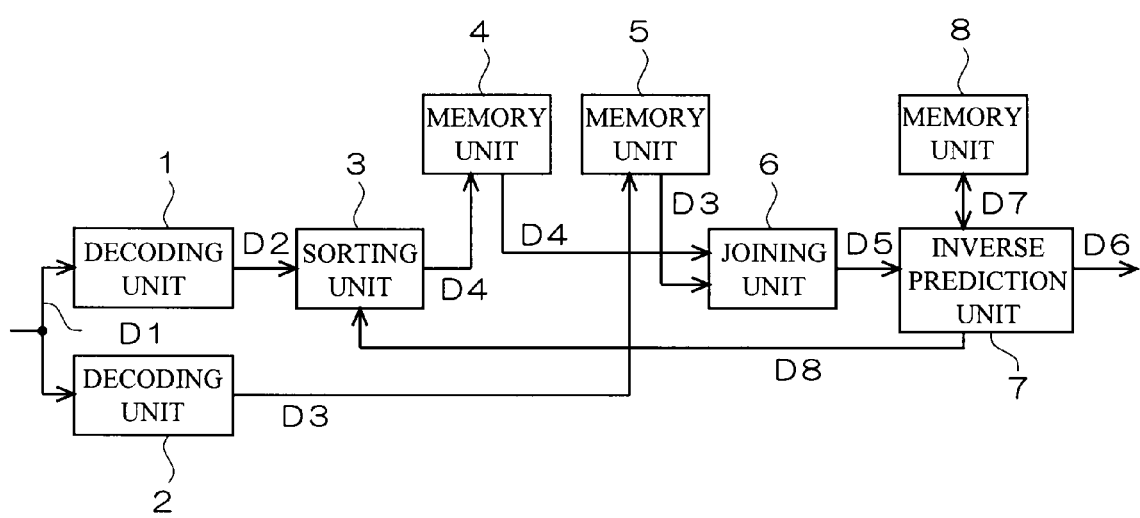
FIG. 1 is a block diagram showing a part of a configuration of a decoder according to a first preferred embodiment of the present invention.

Preferred embodiments of the present invention are described in detail below referring to the drawings. It should be noted that identical reference numerals throughout the drawings indicate identical or equivalent elements. An example of applying an image processor according to the present invention to a decoder for HD Photo is described in the following description. Application of the image processor, however, is not limited to a decoder for HD Photo. Furthermore, YUV444 color space is described below by way of an example. However, application of the image processor is not limited to YUV444 color space.

<First Preferred Embodiment>

FIG. 1 is a block diagram showing a part of a configuration of a decoder according to a first preferred embodiment of the present invention. As shown in relation of connection in FIG. 1, the decoder includes decoding units 1 and 2, a sorting unit 3, memory units 4, 5, and 8, a joining unit 6, and an inverse prediction unit 7.

A data stream D1 including a plurality of frequency data sets encoded by an encoder (not shown) is inputted to the decoding units 1 and 2.

Figure 2A:
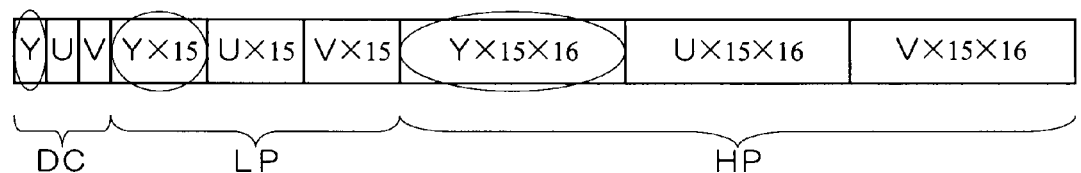
FIGS. 2A to 2D show a configuration of a data stream of one macroblock.
Figure 2B:
Figure 2C:
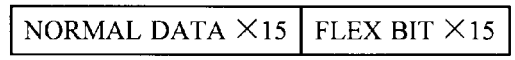
Figure 2D:
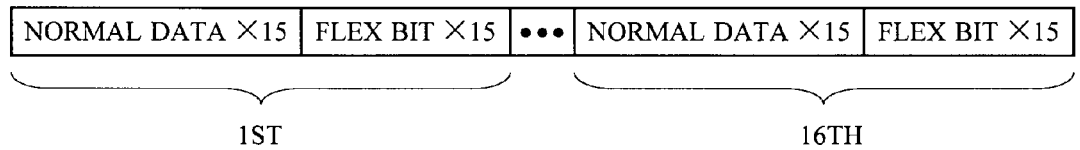

FIGS. 2A to 2D show a configuration of a data stream D1 of one macroblock. FIG. 2A shows the whole data stream D1. FIG. 2B shows a data configuration of DC component for luminance Y. FIG. 2C shows a data configuration of LP component for luminance Y. FIG. 2D shows a data configuration of HP component for luminance Y.

Referring to FIG. 2A, the data stream D1 has a configuration in which one set of data of DC component for luminance Y, one set of data of DC component for chrominance U, one set of data of DC component for chrominance V, 15 sets of data of LP component for luminance Y, 15 sets of data of LP component for chrominance U, 15 sets of data of LP component for chrominance V, 240 sets (15 sets×16 blocks) of data of HP component for luminance Y, 240 sets of data of HP component for chrominance U, and 240 sets of data of HP component for chrominance V are aligned in this order.

Referring to FIG. 2B, the data of DC component for luminance Y has a configuration in which one set of Normal Data is followed by one set of Flex Bits. Referring to FIG. 2C, the data of LP component for luminance Y has a configuration in which 15 sets of Normal Data are followed by 15 sets of Flex Bits. Referring to FIG. 2D, the data of HP component for luminance Y has a configuration in which 16 groups of data are aligned, each group having a configuration in which 15 sets of Normal Data within one block are followed by 15 sets of Flex Bits within the same block.

Referring to FIG. 1, the decoding unit 1 decodes (entropy decoding) Normal Data. The decoding unit 2 decodes Flex Bits.

The sorting unit 3 performs sorting (hereinafter, "Adaptive Scan") of 15 sets of data of LP component, among the data D2 inputted from the decoding unit 1. The sorting unit 3 also performs Adaptive Scan of 15 sets of data of HP component, among the data D2 inputted from the decoding unit 1 on a block-by-block basis. Specifically, the data D2 is sorted so that data in a position where nonzero data appears less frequently is located behind, employing a table indicating frequency of appearance of nonzero data.

Figures 3A, 3B, 3C:
FIGS. 3A to 3C are diagrams showing Adaptive Scan by a sorting unit.

FIGS. 3A to 3C are diagrams showing Adaptive Scan by the sorting unit 3. FIG. 3A shows an index value assigned to 15 data positions. FIG. 3B shows an example of a table TA. FIG. 3C shows 15 sets of data inputted to the sorting unit 3 and 15 sets of data outputted from the sorting unit 3.

Referring to FIG. 3B, in the table TA, when the value of data in a position corresponding to a certain index value is not zero (i.e., in a case of nonzero data), a count value corresponding to the index value is incremented by "1". Then index values are sorted within the table TA so that an index value with a smaller count value is positioned behind.

Figure 15:
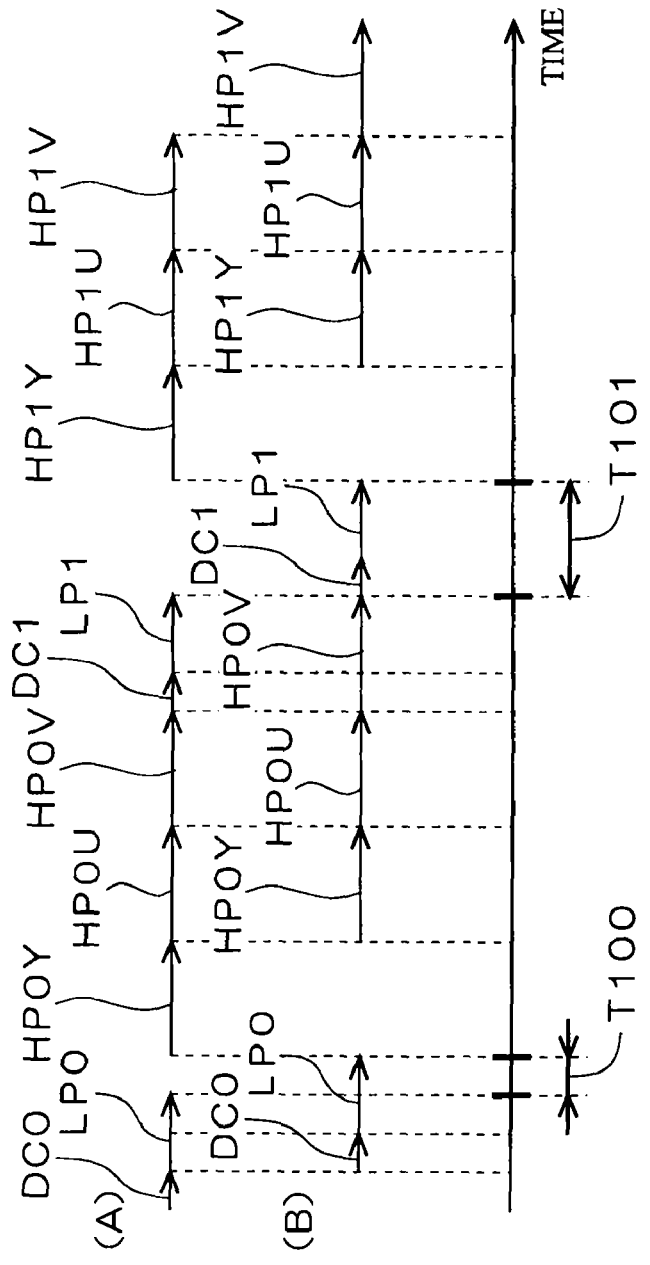
FIG. 15 is a timing diagram showing the operation of the configuration in FIG. 14.

Referring to FIG. 3C, 15 sets of data are inputted from the one in the position with the index value "0" in increasing order to the sorting unit 3. The sorting unit 3 sorts 15 sets of data so that the order of 15 sets of inputted data coincide with the order of the index value within the table TA. Thus in the data outputted from the sorting unit 3, data set in a position where nonzero data appears less frequently is located behind.

Figure 7:
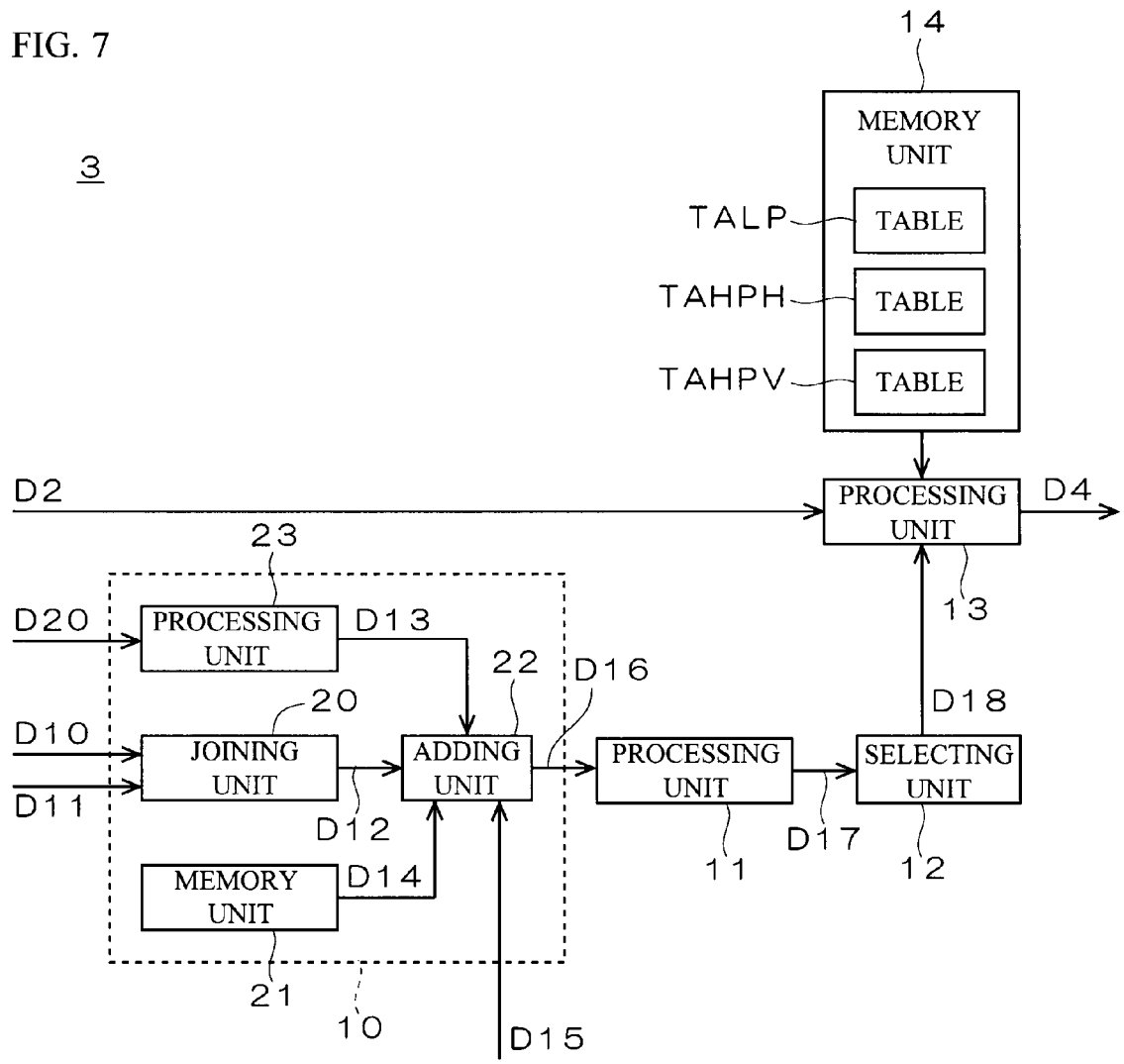
FIG. 7 is a block diagram showing a first example of a configuration of a sorting unit.
Figure 8:
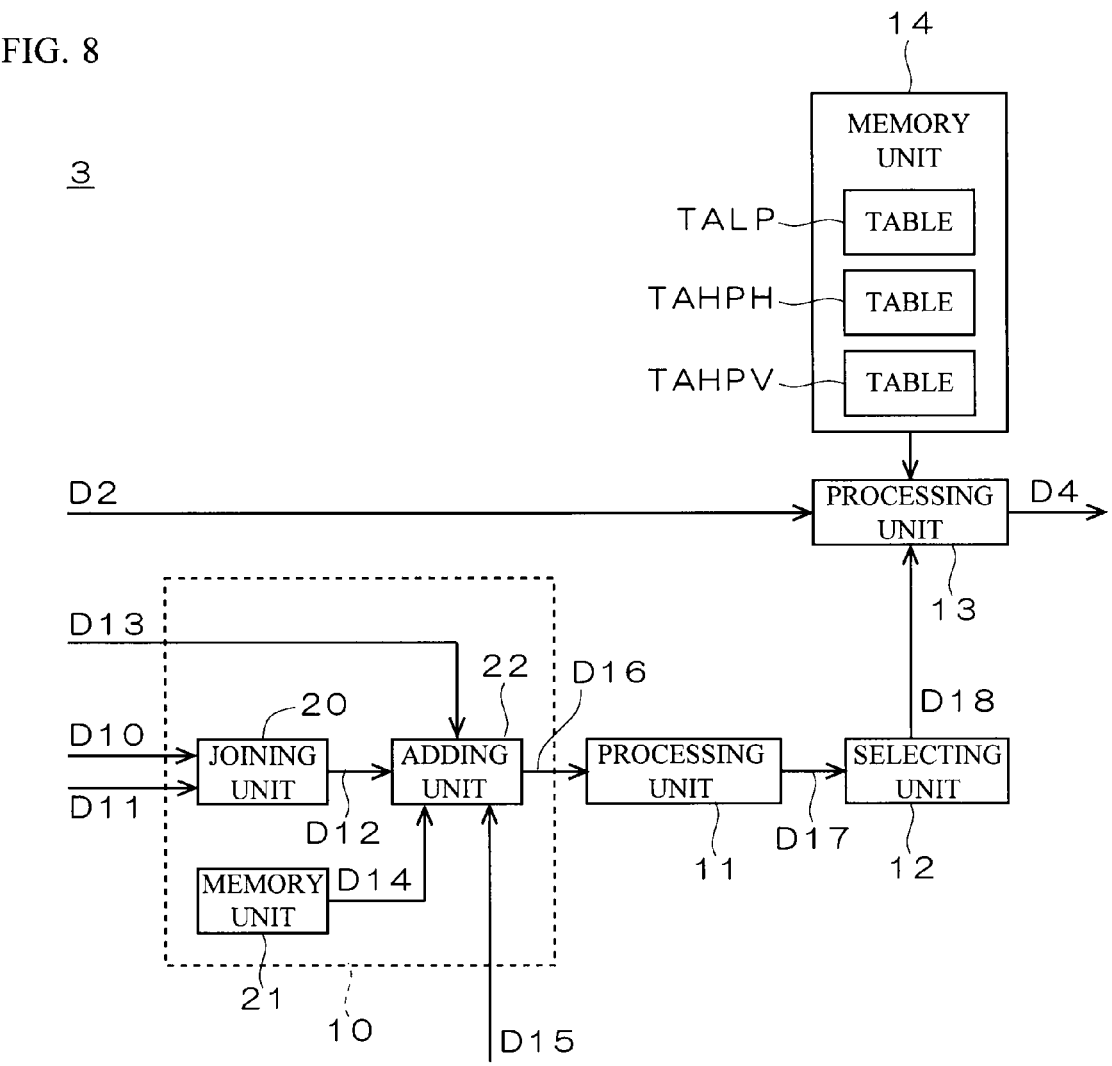
FIG. 8 is a block diagram showing a second example of a configuration of a sorting unit.

For LP component, there is one table (table TALP in FIGS. 7 and 8). For HP component, there are two tables in total, one employed when orientation of prediction of HP component in the macroblock is leftward (table TAHPH), and the other employed when upward (table TAHPV). When there is no orientation of prediction of HP component (i.e., when prediction is not performed), the table TAHPH is employed.

Referring to FIG. 1, data D4 outputted from the sorting unit 3 is inputted to the memory unit 4 and temporarily stored in the memory unit 4. Data D3 outputted from the decoding unit 2 is inputted to the memory unit 5 and temporarily stored in the memory unit 5.

The joining unit 6 reads data D4 and D3 from the memory units 4 and 5, respectively, and joins the data D4, which is Normal Data, and the data D3, which is Flex Bits, so as to generate data D5 with both upper (more significant) and lower (less significant) digits. Furthermore, the joining unit 6 sorts 16 blocks within one macroblock in a predetermined order for data D4 and D3 of HP component.

The inverse prediction unit 7 performs inverse prediction on the data D5. Inverse prediction is performed in the order DC, LP, and HP components.

Figure 4:
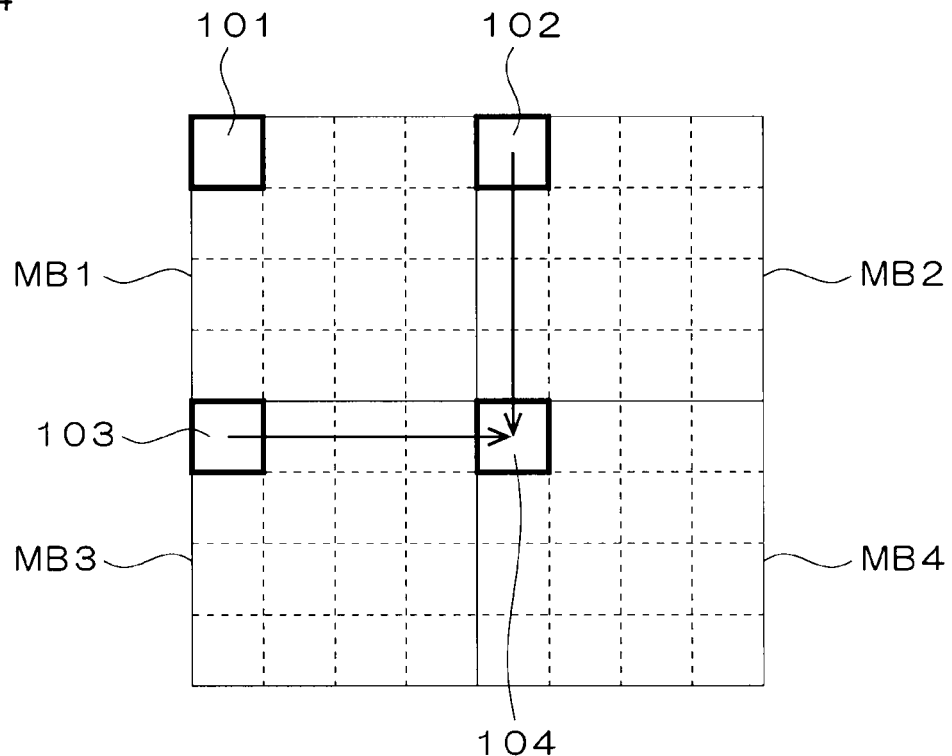
FIG. 4 shows inverse prediction of DC component.

FIG. 4 shows inverse prediction of DC component. Four sets of data 101 to 104 of DC component corresponding to four macroblocks MB1 to MB4 are shown in FIG. 4. Let the currently target data (difference data) be the data 104 of the macroblock MB4 at the bottom right. The data 101 to 103 after inverse prediction necessary for inverse prediction of the data 104 are stored in the memory unit 8 as data D7.

The inverse prediction unit 7 obtains an absolute value of the difference between the data 101 and 103 for each of luminance Y and chrominance U and V, multiplies the absolute value of luminance Y by a predetermined value ("4", for example), and then adds the three absolute values together, so as to obtain an edge determination value in horizontal direction. Similarly, the inverse prediction unit 7 obtains an absolute value of the difference between the data 101 and 102 for each of luminance Y and chrominance U and V, multiplies the absolute value of luminance Y by a predetermined value ("4", for example), and then adds the three absolute values together, so as to obtain an edge determination value in vertical direction. Then when the value obtained by multiplying the edge determination value in horizontal direction by a predetermined value ("4", for example) is smaller than the edge determination value in vertical direction, the inverse prediction unit 7 decides the orientation of prediction is upward. In this case, the prediction value is the value of the data 102. When the value obtained by multiplying the edge determination value in vertical direction by a predetermined value ("4", for example) is smaller than the edge determination value in horizontal direction, the inverse prediction unit 7 decides the orientation of prediction is leftward. In this case, the prediction value is the value of the data 103. When neither of the above cases applies, the average value between the values of data 102 and 103 serves as the prediction value.

The inverse prediction unit 7 adds the prediction value obtained above to the value of the data 104, which is difference data, so as to obtain the data 104 after inverse prediction.

Prediction is not performed on a macroblock in the top left corner of a pixel plane, since there is no adjacent macroblock above or on the left. The orientation of prediction of a macroblock in the leftmost column of a pixel plane is upward, since there is no adjacent macroblock on the left. The orientation of prediction of a macroblock in the top row of a pixel plane is leftward, since there is no adjacent macroblock above.

Figure 5:
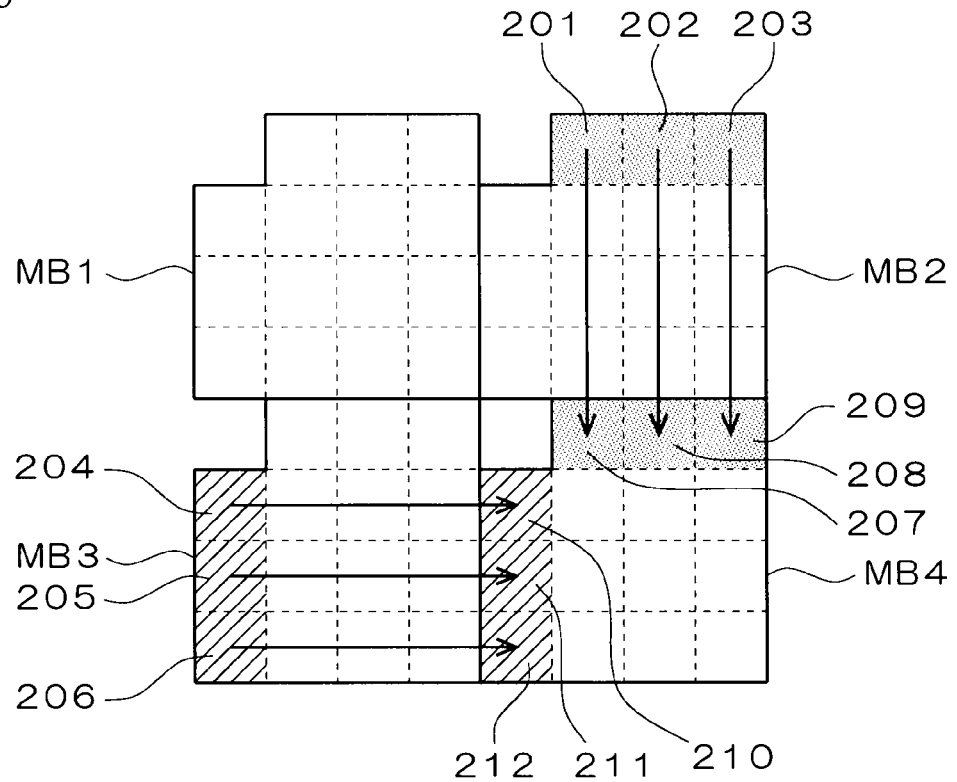
FIG. 5 shows inverse prediction of LP component.

FIG. 5 shows inverse prediction of LP component. A total of 60 sets of data of LP component corresponding to four macroblocks MB1 to MB4, are shown in FIG. 5 corresponding to FIG. 4. Let the currently target data be the data 207 to 212 (difference data) of the macroblock MB4 at the bottom right. The data 201 to 206 after inverse prediction necessary for inverse prediction of the data 207 to 212 are stored in the memory unit 8 as data D7.

When the orientation of prediction of the data 104 of DC component of the macroblock MB4 (see FIG. 4) is upward and the quantization coefficient of LP component of the macroblock MB4 is equal to that of the macroblock MB2, the orientation of prediction is upward. In this case, the values of the data 201, 202, and 203 respectively serve as the prediction values of the data 207, 208, and 209. Also in this case, prediction is not performed on the other 12 sets of data within the macroblock MB4.

When the orientation of prediction of the data 104 of DC component of the macroblock MB4 is leftward and the quantization coefficient of LP component of the macroblock MB4 is equal to that of the macroblock MB3, the orientation of prediction is leftward. In this case, the values of the data 204, 205, and 206 respectively serve as the prediction values of the data 210, 211, and 212. Also in this case, prediction is not performed on the other 12 sets of data within the macroblock MB4.

When neither of the above cases applies, prediction is not performed on any data within the macroblock MB4. That is, the prediction value is zero.

The inverse prediction unit 7 adds the prediction value obtained above to the values of the data 207 to 209 or data 210 to 212, which are difference data, so as to obtain the data 207 to 212 after inverse prediction.

Figure 6:
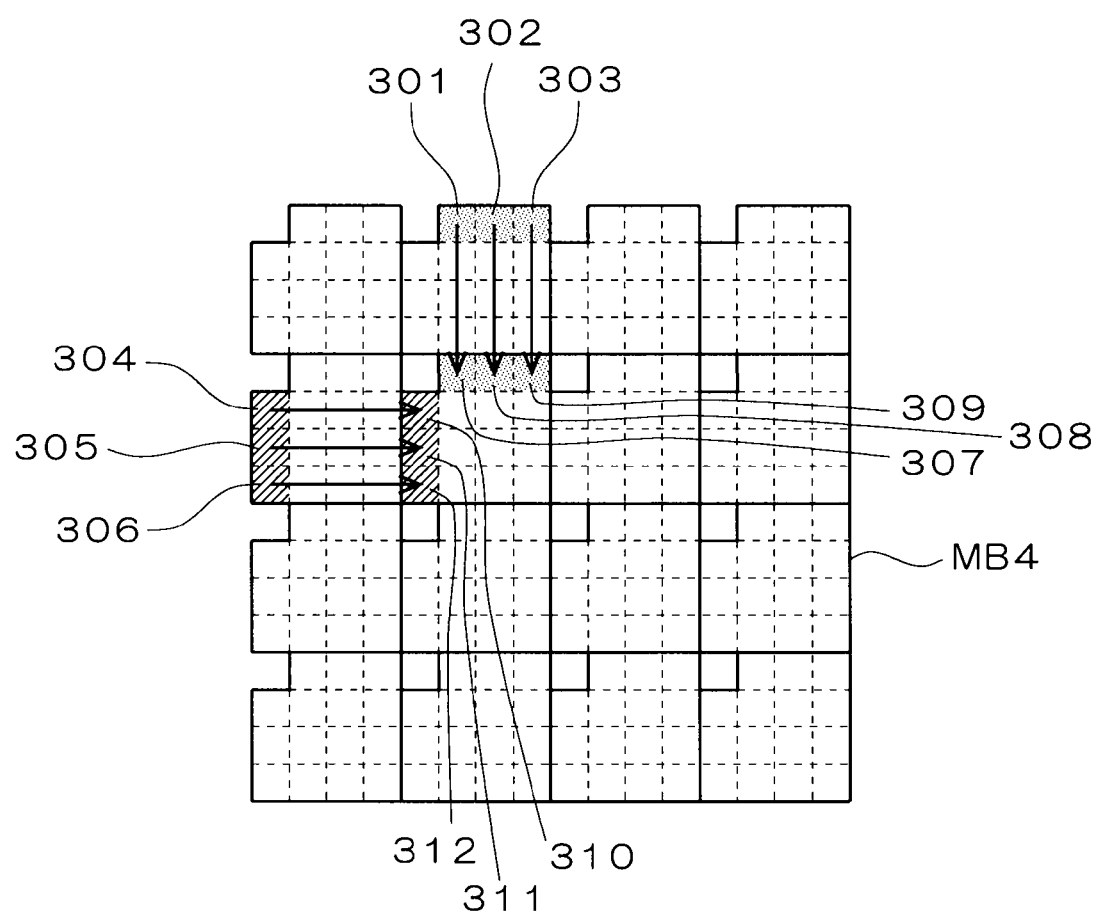
FIG. 6 shows inverse prediction of HP component.

FIG. 6 shows inverse prediction of HP component. A total of 240 sets of frequency data of HP component corresponding to one macroblock MB4 are shown in FIG. 6. Let the currently target data be the data 307 to 312 (difference data) of the block second from the left and second from the top.

Referring to FIG. 5, the inverse prediction unit 7 adds the values of the data 207 to 209 after inverse prediction of luminance Y and the values of the data 207 after inverse prediction of each of chrominance U and V all together, so as to obtain an edge determination value in horizontal direction. Similarly, the inverse prediction unit 7 adds the values of the data 210 to 212 after inverse prediction of luminance Y and the values of the data 210 after inverse prediction of each of chrominance U and V all together, so as to obtain an edge determination value in vertical direction.

When the value obtained by multiplying the edge determination value in horizontal direction by a predetermined value ("4", for example) is smaller than the edge determination value in vertical direction, the inverse prediction unit 7 decides the orientation of prediction is leftward. In this case, referring to FIG. 6, the values of the data 304, 305, and 306 respectively serve as the prediction values of the data 310, 311, and 312. Also in this case, prediction is not performed on the other 12 sets of data within the same block.

When the value obtained by multiplying the edge determination value in vertical direction by a predetermined value ("4", for example) is smaller than the edge determination value in horizontal direction, the inverse prediction unit 7 decides the orientation of prediction is upward. In this case, the values of the data 301, 302, and 303 respectively serve as the prediction values of the data 307, 308, and 309. Also in this case, prediction is not performed on the other 12 sets of data within the same block.

When neither of the above cases applies, the inverse prediction unit 7 does not perform prediction on any data within the same block. That is, the prediction value is zero.

The inverse prediction unit 7 adds the prediction value obtained above to the values of the data 307 to 309 or the data 310 to 312, which are difference data, so as to obtain the data 307 to 312 after inverse prediction.

Referring to FIG. 1, data D6 after inverse prediction by the inverse prediction unit 7 is inputted to an inverse quantization unit (not shown).

FIG. 7 is a block diagram showing a first example of the configuration of the sorting unit 3. As shown in relation of connection in FIG. 7, the sorting unit 3 includes an inverse prediction unit 10, processing units 11 and 13, a selecting unit 12, and a memory unit 14. Tables TALP, TAHPH, and TAHPV are stored in the memory unit 14. The inverse prediction unit 10 includes a joining unit 20, a memory unit 21, an adding unit 22, and a processing unit 23.

The data D2 is inputted from the decoding unit 1 shown in FIG. 1 to the processing unit 13. The processing unit 13 outputs the data D2 of DC component without change. Then the processing unit 13 performs Adaptive Scan on the 15 sets of data D2 of LP component employing the table TALP, and on 15 sets of data D2 of HP component in each block employing either one of the tables TAHPH and TAHPV. In order to select one of the tables TAHPH and TAHPV, information on the orientation of prediction of HP component of the currently target macroblock is required. Instead of getting the information from the inverse prediction unit 7 in the subsequent stage (see FIG. 1), the sorting unit 3 generates the information on its own as described below. In the description below, referring to FIG. 5, it is assumed that the currently target macroblock is the macroblock MB4.

The data 103 after inverse prediction of DC component (see FIG. 4) of the formerly target macroblock MB3 of the sorting unit 3 (that is, the currently target macroblock of the inverse prediction unit 7) is inputted from the inverse prediction unit 7 to the processing unit 23, as data D20 (part of the data D8 shown in FIG. 1). The data 101 and 102 are also inputted from the inverse prediction unit 7 to the processing unit 23 along with the data 103. The data 101 and 102 are stored in the memory unit 8. The inverse prediction unit 7 reads the data 101 and 102 from the memory unit 8 to input them to the processing unit 23. The processing unit 23 may read the data 101 and 102 directly from the memory unit 8. Alternatively, a line memory for storing the data 101 and 102 may be arranged in the inverse prediction unit 10, so that the processing unit 23 can read the data 101 and 102 from the line memory.

The processing unit 23 obtains the orientation of prediction of DC component, applying the same method as the inverse prediction unit 7 described above. That is, the processing unit 23 obtains an absolute value of the difference between the data 101 and 103 for each of luminance Y and chrominance U and V, multiplies the absolute value of luminance Y by a predetermined value ("4", for example), and then adds the three absolute values together, so as to obtain an edge determination value in horizontal direction. Similarly, the processing unit 23 obtains an absolute value of the difference between the data 101 and 102 for each of luminance Y and chrominance U and V, multiplies the absolute value of luminance Y by a predetermined value ("4", for example), and then adds the three absolute values together, so as to obtain an edge determination value in vertical direction. Then when the value obtained by multiplying the edge determination value in horizontal direction by a predetermined value ("4", for example) is smaller than the edge determination value in vertical direction, the processing unit 23 decides the orientation of prediction is upward. When the value obtained by multiplying the edge determination value in vertical direction by a predetermined value ("4", for example) is smaller than the edge determination value in horizontal direction, the processing unit 23 decides the orientation of prediction is leftward.

The processing unit 23 then obtains the orientation of prediction of LP component, applying the same method as the inverse prediction unit 7 described above. That is, when the orientation of prediction of DC component is upward and the quantization coefficient of LP component of the currently target macroblock MB4 is equal to that of the macroblock MB2 positioned above, the processing unit 23 decides the orientation of prediction of LP component is upward. When the orientation of prediction of DC component is leftward and the quantization coefficient of LP component of the currently target macroblock MB4 is equal to that of the macroblock MB3 positioned on the left, the processing unit 23 decides the orientation of prediction of LP component is leftward. When neither of the above cases applies, the processing unit 23 decides there is no orientation of prediction (i.e., prediction is not performed).

The information on the orientation of prediction of LP component obtained by the processing unit 23 is inputted to the adding unit 22 as data D13.

FIG. 8 is a block diagram showing a second example of the configuration of the sorting unit 3. According to the configuration in FIG. 7, the data 101 to 103 are inputted from the inverse prediction unit 7 to the processing unit 23, and the processing unit 23 obtains the orientation of prediction of DC and LP components. In contrast, according to the configuration in FIG. 8, the processing unit 23 is omitted, and the inverse prediction unit 7 obtains the orientation of prediction of DC and LP components, based on the data 101 to 103. Then the information on the orientation of prediction of LP component is inputted from the inverse prediction unit 7 to the adding unit 22 as data D13. The rest of the configuration and operation is the same as in FIG. 7.

Referring to FIG. 7, data D10 and D11 are inputted to the joining unit 20. The data D10 is Normal Data of the data 207 to 212 after Adaptive Scan (see FIG. 5), and the data D11 is Flex Bits of the data 207 to 212. The joining unit 20 joins the Normal Data and Flex Bits, so as to generate data 207 to 212 with both upper and lower digits. The data 207 to 212 are inputted to the adding unit 22 as data D12.

Specific data 204 to 206 of the macroblock MB3 are stored in the memory unit 21. The macroblock MB3 is positioned on the left of the macroblock MB4 and thus is the macroblock formerly processed in the sorting unit 3. The data 204 to 206 stored in the memory unit 21 need to be not difference data but instead the data after inverse prediction.

When the orientation of prediction of LP component of the macroblock MB3 is not leftward, the data 204 to 206 outputted from the joining unit 20 serve as the data 204 to 206 after inverse prediction without change. In contrast, when the orientation of prediction of LP component of the macroblock MB3 is leftward, the data 204 to 206 outputted from the joining unit 20 with the corresponding data within the macroblock on the left of the macroblock MB3 (i.e., the data after inverse prediction in the same position as the data 204 to 206) being added serve as the data 204 to 206 after inverse prediction. The corresponding data after inverse prediction has already been obtained by the inverse prediction unit 7 at this time. Thus the data is available to the sorting unit 3 from the inverse prediction unit 7.

The data 204 to 206 stored in the memory unit 21 are inputted to the adding unit 22 as data D14.

Specific data 201 to 203 after inverse prediction of the macroblock MB2 are inputted from the inverse prediction unit 7 to the adding unit 22 as data D15 (part of the data D8 shown in FIG. 1). The macroblock MB2 is positioned above the macroblock MB4, and thus is the macroblock processed before the formerly processed macroblock. The data 201 to 203 after inverse prediction are stored in the memory unit 8, and the inverse prediction unit 7 reads the data 201 to 203 from the memory unit 8 to input them to the adding unit 22. The adding unit 22 may read the data 201 to 203 directly from the memory unit 8. Alternatively, a line memory for storing the data 201 to 203 may be arranged in the inverse prediction unit 10, so that the adding unit 22 can read the data 201 to 203 from the line memory.

As described above, the information on the orientation of prediction of LP component of the presently target macroblock MB4 has been inputted to the adding unit 22 as data D13.

When the data D13 indicates the orientation of prediction is leftward, the adding unit 22 adds the values of the data 204, 205, and 206 after inverse prediction respectively to the values of the difference data 210, 211, and 212. When the data D13 indicates the orientation of prediction is upward, the adding unit 22 adds the values of the data 201, 202, and 203 after inverse prediction respectively to the values of the difference data 207, 208, and 209. When the data D13 indicates there is no orientation of prediction (i.e., when prediction is not performed), the adding unit 22 does not perform addition on the data 207 to 212. Consequently, the data 207 to 212 after inverse prediction are generated and inputted to the processing unit 11 as data D16.

The processing unit 11 obtains the orientation of prediction of HP component based on the data 207 to 212, applying the same method as the inverse prediction unit 7 described above. That is, the processing unit 11 adds the values of the data 207 to 209 after inverse prediction of luminance Y and the values of the data 207 after inverse prediction of each of chrominance U and V all together, so as to obtain an edge determination value in horizontal direction. Similarly, the processing unit 11 adds the values of the data 210 to 212 after inverse prediction of luminance Y and the values of the data 210 after inverse prediction of each of chrominance U and V all together, so as to obtain an edge determination value in vertical direction. When the value obtained by multiplying the edge determination value in horizontal direction by a predetermined value ("4", for example) is smaller than the edge determination value in vertical direction, the processing unit 11 decides the orientation of prediction is leftward. When the value obtained by multiplying the edge determination value in vertical direction by a predetermined value ("4", for example) is smaller than the edge determination value in horizontal direction, the processing unit 11 decides the orientation of prediction is upward. When neither of the above cases applies, the processing unit 11 decides there is no orientation of prediction (i.e., prediction is not performed).

The information on the orientation of prediction of HP component obtained by the processing unit 11 is inputted to the selecting unit 12 as data D17. Based on the data D17, the selecting unit 12 generates a selection signal D18 for allowing the processing unit 13 to select one of the tables TAHPH and TAHPV. The selection signal D18 is inputted to the processing unit 13. When the data D17 indicates that the orientation of prediction is leftward or that there is no orientation of prediction, the leftward table TAHPH is selected. When the data D17 indicates that the orientation of prediction is upward, the upward table TAHPV is selected.

In the decoder (image processor) according to the first preferred embodiment, the sorting unit 3 performs inverse prediction on the data of LP component with the inverse prediction unit 10 provided in the sorting unit 3 itself, and obtains the orientation of prediction of HP component with the processing unit 11 provided in the sorting unit 3 itself. This enables the sorting unit 3 to select one of the tables TAHPH and TAHPV based on the orientation of prediction (data D17) of the HP component obtained by the sorting unit 3 itself, without waiting for the orientation of prediction of HP component to be obtained in the inverse prediction unit 7 in the subsequent stage. This enables the processing unit 13 to start Adaptive Scan of the data D2 of HP component, without waiting for the orientation of prediction of HP component to be obtained in the inverse prediction unit 7 in the subsequent stage. Consequently, waiting time in the sorting unit 3 is eliminated, and thus time required for decoding is reduced.

Figure 9:
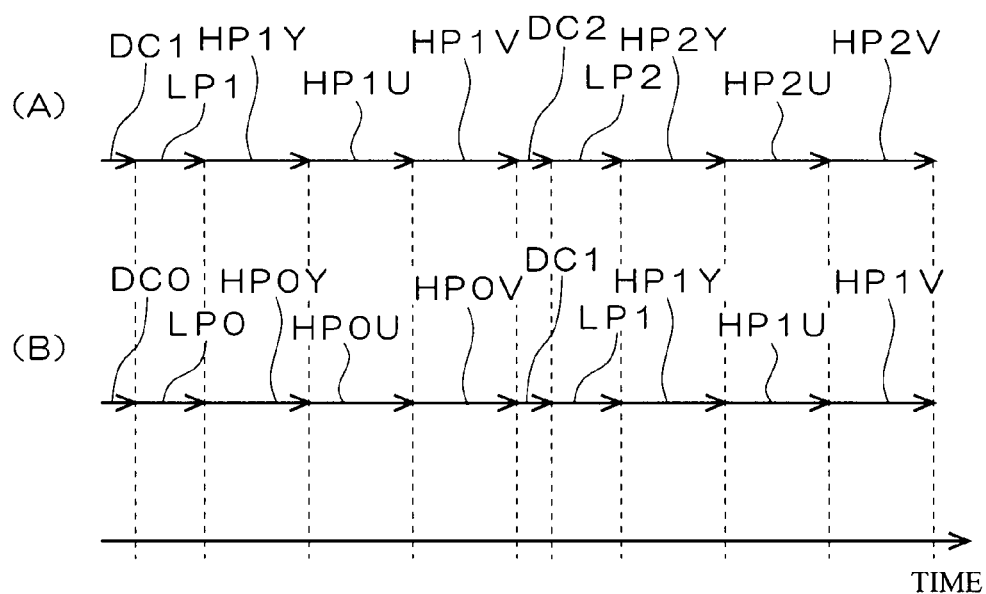
FIG. 9 is a timing diagram showing the operation of the configuration in FIG. 1.

FIG. 9 is a timing diagram showing the operation of the configuration in FIG. 1. (A) indicates a time period during which data is written to the memory units 4 and 5. (B) indicates a time period during which inverse prediction is performed in the inverse prediction unit 7. As shown in FIG. 9, no time lag occurs between when writing of data LP1 of LP component of the first macroblock is completed and when writing of data HP1Y of HP component of the first macroblock is started. Similarly, no time lag occurs between when writing of data LP2 of LP component of the second macroblock is completed and when writing of data HP2Y of HP component of the second macroblock is started.

According to a configuration in FIG. 8, information on the orientation of prediction of LP component (data D13) is inputted from the inverse prediction unit 7 to the inverse prediction unit 10. Thus the sorting unit 3 does not require a circuit for obtaining the orientation of prediction of LP component (processing unit 23 in FIG. 7) to be provided in itself. Consequently, circuit size of the sorting unit 3 is reduced.

According to a configuration in FIG. 7, the sorting unit 3 obtains the orientation of prediction of LP component with the processing unit 23 provided in itself, instead of getting the information on the orientation of prediction of LP component (data D13) from the inverse prediction unit 7. This enables the sorting unit 3 to start inverse prediction of LP component, without waiting for the orientation of prediction of LP component to be obtained by the inverse prediction unit 7. Consequently, time required for decoding is reduced. Furthermore, there is no need for timing adjustment to obtain information on the orientation of prediction of LP component from the inverse prediction unit 7 in the subsequent stage.

Moreover, in the decoder according to the first preferred embodiment, the sorting unit 3 holds specific data 204 to 206 after inverse prediction within the formerly processed macroblock MB3 in the memory unit 21 provided in itself, instead of getting the data after inverse prediction from the inverse prediction unit 7. This enables the sorting unit 3 to start inverse prediction of LP component of the currently target macroblock MB4, without waiting for the data after inverse prediction 204 to 206 to be obtained by the inverse prediction unit 7. Consequently, time required for decoding is reduced. The formerly processed macroblock MB3 is an adjacent macroblock on the same row as the presently target macroblock MB4. Thus sets of data 204 to 206 within the formerly processed macroblock MB3 are not too many in number (three sets for the data of LP component in HD Photo) to keep increase in the circuit size of the sorting unit 3 caused by adding the memory unit 21 to a minimum.

In the decoder according to the first preferred embodiment, specific data 201 to 203 necessary for inverse prediction in the sorting unit 3 are inputted from the inverse prediction unit 7 to the sorting unit 3. Thus the sorting unit 3 does not require a line memory for storing the data 201 to 203 to be provided in itself. Consequently, the circuit size of the sorting unit 3 is reduced. Since the data 201 to 203 are the data of the macroblock processed by the sorting unit 3 before the formerly processed macroblock, they have already been obtained in the inverse prediction unit 7. Thus the sorting unit 3 can get the data after inverse prediction 201 to 203 from the inverse prediction unit 7 without waiting time.

<Second Preferred Embodiment>

Figure 10:
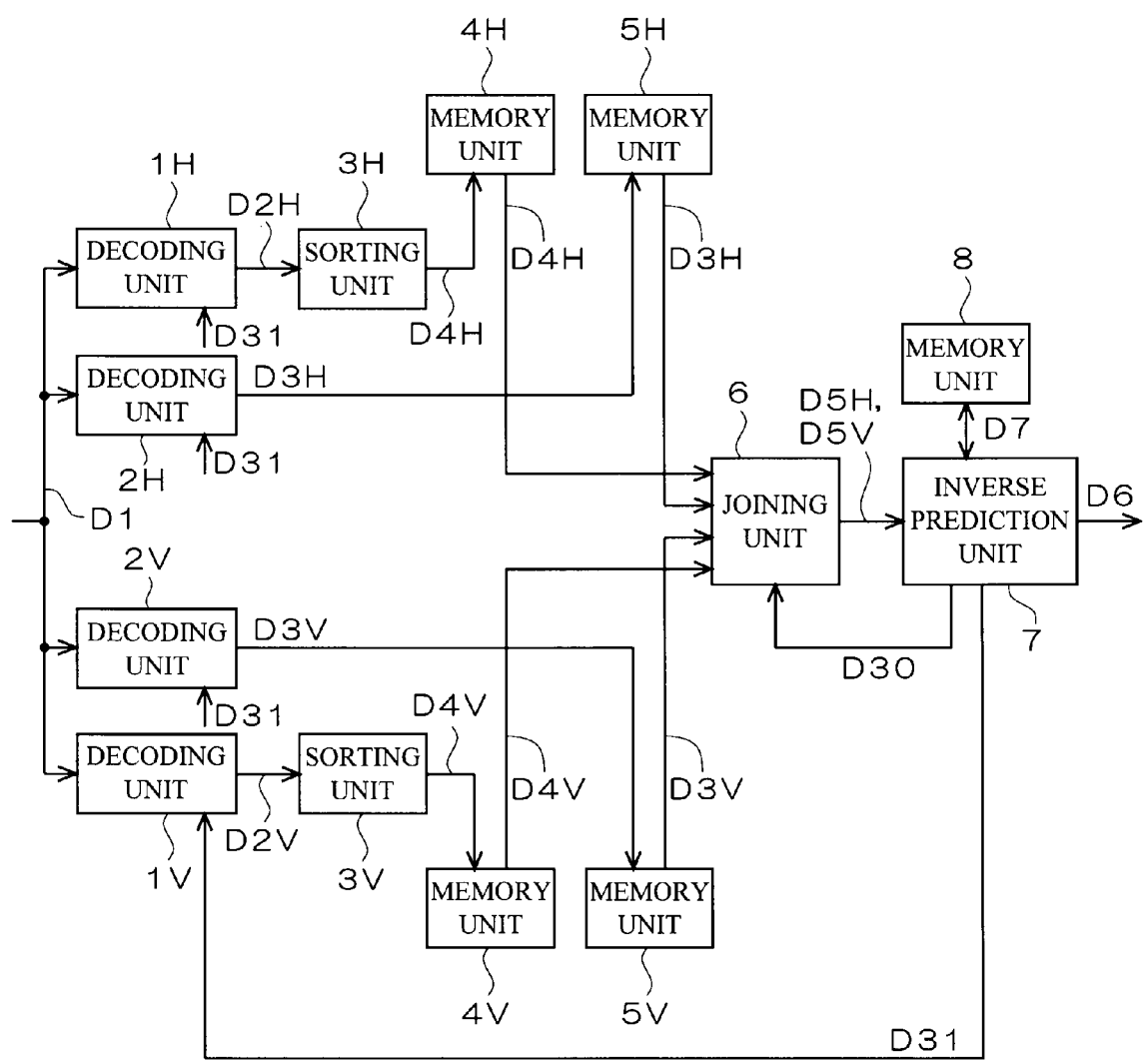
FIG. 10 is a block diagram showing a part of a configuration of a decoder according to a second preferred embodiment of the present invention.

FIG. 10 is a block diagram showing a part of a configuration of a decoder according to a second preferred embodiment of the present invention. As shown in relation of connection in FIG. 10, the decoder includes decoding units 1H and 2H, a sorting unit 3H, memory units 4H and 5H, decoding units 1V and 2V, a sorting unit 3V, memory units 4V and 5V, a joining unit 6, an inverse prediction unit 7, and a memory unit 8.

The decoding units 1H and 1V decode Normal Data. The decoding units 2H and 2V decode Flex Bits.

Figure 11:
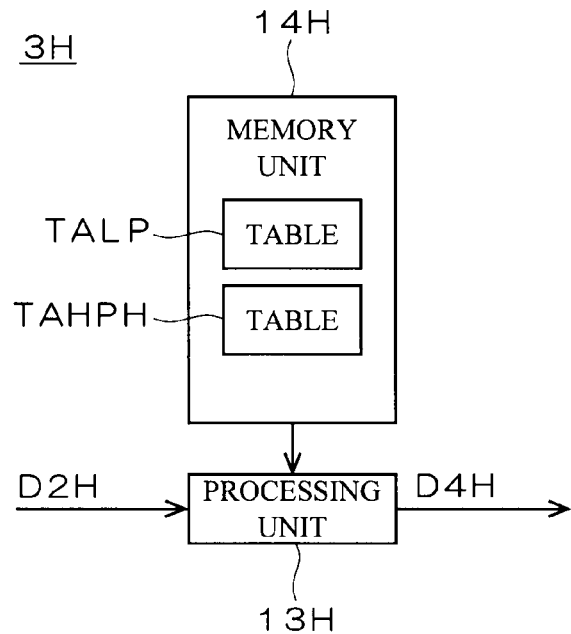
FIG. 11 is a block diagram showing a configuration of a sorting unit.

FIG. 11 is a block diagram showing a configuration of the sorting unit 3H. The sorting unit 3H includes a processing unit 13H and a memory unit 14H. Tables TALP and TAHPH are stored in the memory unit 14H.

Figure 12:
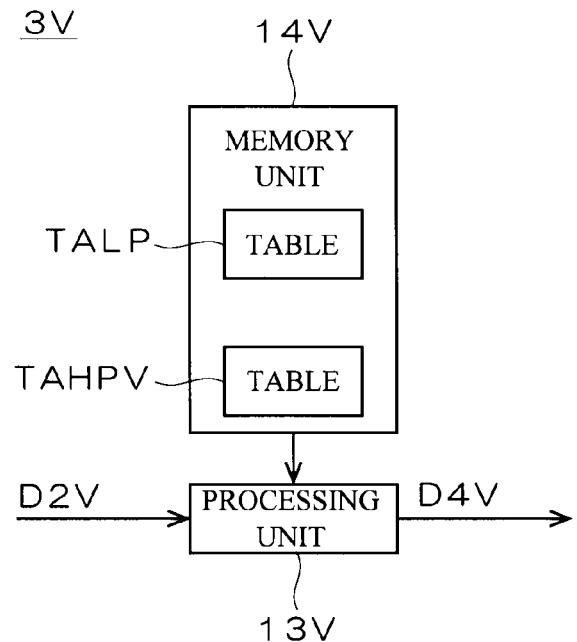
FIG. 12 is a block diagram showing a configuration of a sorting unit.

FIG. 12 is a block diagram showing a configuration of the sorting unit 3V. The sorting unit 3V includes a processing unit 13V and a memory unit 14V. Tables TALP and TAHPV are stored in the memory unit 14V.

Referring to FIG. 11, data D2H is inputted from the decoding unit 1H shown in FIG. 10 to the processing unit 13H. The processing unit 13H outputs the data D2H of DC component without change. Then the processing unit 13H performs Adaptive Scan on the 15 sets of data D2H of LP component, employing the table TALP. When Adaptive Scan of LP component is completed, the processing unit 13H subsequently performs Adaptive Scan on 15 sets of data D2H of HP component in each block, employing the table TAHPH.

Referring to FIG. 12, data D2V is inputted from the decoding unit 1V shown in FIG. 10 to the processing unit 13V. The processing unit 13V outputs the data D2V of DC component without change. Then the processing unit 13V performs Adaptive Scan on the 15 sets of data D2V of LP component, employing the table TALP. When Adaptive Scan of LP component is completed, the processing unit 13V subsequently performs Adaptive Scan on 15 sets of data D2V of HP component in each block, employing the table TAHPV.

Referring to FIG. 10, data D4H outputted from the sorting unit 3H is inputted to the memory unit 4H and temporarily stored in the memory unit 4H. Data D3H outputted from the decoding unit 2H is inputted to the memory unit 5H and temporarily stored in the memory unit 5H. Similarly, data D4V outputted from the sorting unit 3V is inputted to the memory unit 4V and temporarily stored in the memory unit 4V. Data D3V outputted from the decoding unit 2V is inputted to the memory unit 5V and temporarily stored in the memory unit 5V.

The joining unit 6 reads data D4H and D3H of DC and LP components respectively from the memory units 4H and 5H, and joins the data D4H, which is Normal Data, and the data D3H, which is Flex Bits, so as to generate data D5H with both upper and lower digits. The joining unit 6 also reads data D4V and D3V of DC and LP components respectively from the memory units 4V and 5V, and joins the data D4V, which is Normal Data, and the data D3V, which is Flex Bits, so as to generate data D5V with both upper and lower digits. The data D5H and D5V of DC and LP components are inputted to the inverse prediction unit 7. These processings of the DC and LP components by the joining unit 6 are performed concurrently with Adaptive Scan of HP component by the sorting units 3H and 3V.

When inverse prediction of DC component of the formerly target macroblock is completed in the inverse prediction unit 7, the orientation of prediction of DC component of the currently target macroblock is obtained, and accordingly, the orientation of prediction of LP component of the currently target macroblock is obtained. The inverse prediction unit 7 performs inverse prediction of LP component, based on the orientation of prediction of LP component. Based on the specific data (data 207 to 212 in FIG. 5) of LP component after inverse prediction, the orientation of prediction of HP component of the currently target macroblock is obtained.

The inverse prediction unit 7 inputs information on the orientation of prediction of HP component to the joining unit 6 as data D30.

When the data D30 indicates that the orientation of prediction is leftward or that there is no orientation of prediction, the joining unit 6 reads the data D4H and D3H of HP component from the memory units 4H and 5H, respectively, and joins the data D4H, which is Normal Data, and the data D3H, which is Flex Bits, so as to generate data D5H with both upper and lower digits. Furthermore, the joining unit 6 sorts 16 blocks within one macroblock in a predetermined order for data D4H and D3H of HP component. The data D5H of HP component generated by the joining unit 6 is inputted to the inverse prediction unit 7. In this case, the joining unit 6 does not read the data D4V and D3V of HP component from the memory units 4V and 5V. The data D4V and D3V of HP component are deleted from the memory units 4V and 5V.

Information that the data D4H and D3H of HP component have been selected is inputted from the inverse prediction unit 7 to the decoding units 1H, 2H, 1V, and 2V as data D31. Based on the data D31, the decoding units 1H, 2H, 1V, and 2V determine a start position of decoding of a subsequently target macroblock in the data stream D1. Specifically, it is determined that the bit following the last bit of the currently target macroblock processed by the decoding unit 2H is the start position of decoding of the subsequently target macroblock.

In contrast, when the data D30 indicates that the orientation of prediction is upward, the joining unit 6 reads data D4V and D3V of HP component from the memory units 4V and 5V, respectively, and joins the data D4V, which is Normal Data, and the data D3V, which is Flex Bits, so as to generate data D5V with both upper and lower digits. Furthermore, the joining unit 6 sorts 16 blocks within one macroblock in a predetermined order for data D4V and D3V of HP component. The data D5V of HP component generated by the joining unit 6 is inputted to the inverse prediction unit 7. In this case, the joining unit 6 does not read the data D4H and D3H of HP component from the memory units 4H and 5H. The data D4H and D3H of HP component are deleted from the memory units 4H and 5H.

Information that the data D4V and D3V of HP component have been selected is inputted from the inverse prediction unit 7 to the decoding units 1H, 2H, 1V, and 2V as data D31. Based on the data D31, the decoding units 1H, 2H, 1V, and 2V determine a start position of decoding of a subsequently target macroblock in the data stream D1. Specifically, it is determined that the bit following the last bit of the currently target macroblock processed by the decoding unit 2V is the start position of decoding of the subsequently target macroblock.

The decoder (image processor) according to the second preferred embodiment includes the sorting unit 3H sorting HP component employing the table TAHPH and the sorting unit 3V sorting HP component employing the table TAHPV. Adaptive Scan by the sorting unit 3H and Adaptive Scan by the sorting unit 3V are performed concurrently. When the orientation of prediction of HP component is later obtained by the inverse prediction unit 7, the correct one of the sorting units 3H and 3V is selected. This enables the sorting units 3H and 3V to start Adaptive Scan of HP component, without waiting for the orientation of prediction of HP component to be obtained by the inverse prediction unit 7 in the subsequent stage. Consequently, waiting time in the sorting units 3H and 3V is eliminated, and thus time required for decoding is reduced.

Figure 13:
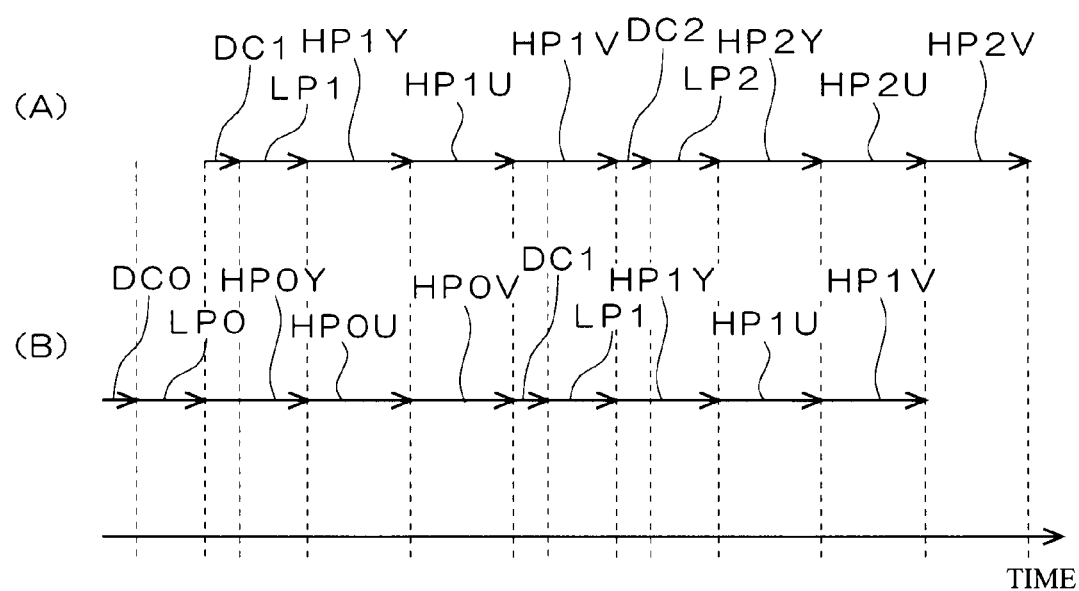
FIG. 13 is a timing diagram showing the operation of the configuration in FIG. 10.
Figure 14:
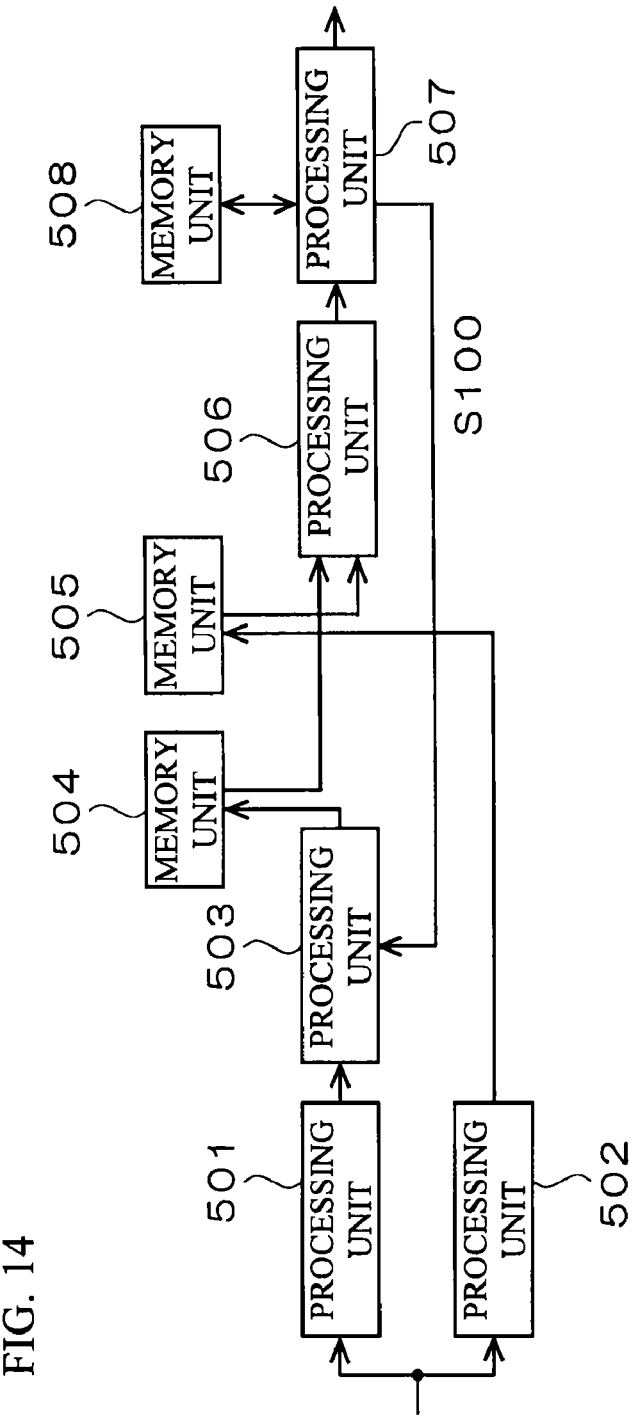
FIG. 14 is a block diagram showing a part of a configuration of a decoder for HD

FIG. 13 is a timing diagram showing the operation of the configuration in FIG. 10. (A) indicates a time period during which data is written to the memory units 4H, 4V, 5H, and 5V. (B) indicates a time period during which inverse prediction is performed in the inverse prediction unit 7. As shown in FIG. 13, no time lag occurs between when writing of data LP1 of LP component of the first macroblock is completed and when writing of data HP1Y of HP component of the first macroblock is started. Similarly, no time lag occurs between when writing of data LP2 of LP component of the second macroblock is completed and when writing of data HP2Y of HP component of the second macroblock is started.

The data of HP component differs in data length, depending on the orientation of prediction of HP component in the currently target macroblock. That is, start position of decoding of the subsequently target macroblock in the data stream D1 differs, depending on the orientation of prediction of HP component in the currently target macroblock. In the decoder according to the second preferred embodiment, the decoding units 1H, 2H, 1V and 2V are notified of the information (data D31) on the orientation of prediction of HP component obtained in the inverse prediction unit 7, and based on this information, determines the start position of decoding of a subsequent macroblock in the data stream D1. Thus the decoding units 1H, 2H, 1V and 2V can start decoding of the subsequent macroblock from an appropriate position in the data stream D1.

While the invention has been described in detail, the foregoing description is in all aspects illustrative and not restrictive. It is understood that numerous other modifications and variations can be devised without departing from the scope of the invention.

What is claimed is:

1. An image processor comprising:
a decoding unit decoding first data of first frequency component and second data of second frequency component, the second data including a plurality of second data sets;
a sorting unit sorting the plurality of second data sets having been processed by the decoding unit, selectively employing one of a first table indicating frequency of appearance of nonzero data corresponding to a first orientation of prediction and a second table indicating frequency of appearance of nonzero data corresponding to a second orientation of prediction in accordance with an orientation of prediction of the second data; and
an inverse prediction unit performing inverse prediction on the first and second data having been processed by the sorting unit,
wherein obtaining the orientation of prediction of the second data requires the first data after inverse prediction,
the sorting unit including:
a first processing unit performing inverse prediction on the first data inputted from the decoding unit;
a second processing unit obtaining the orientation of prediction of the second data, based on the first data after inverse prediction by the first processing unit; and
a third processing unit selecting one of the first and second tables, based on the orientation of prediction of the second data obtained by the second processing unit.

2. The image processor according to claim 1, wherein
inverse prediction of the first data requires information on the orientation of prediction of the first data, and
the information is inputted from the inverse prediction unit to the first processing unit.

3. The image processor according to claim 2, wherein
inverse prediction of the first data requires specific first data within a macroblock formerly processed by the sorting unit,
the sorting unit further including a memory unit for storing the specific first data.

4. The image processor according to claim 3, wherein
inverse prediction of the first data requires specific first data within a macroblock processed by the sorting unit before the formerly processed macroblock, and
the specific first data is inputted from the inverse prediction unit to the first processing unit.

5. The image processor according to claim 2, wherein
inverse prediction of the first data requires specific first data within a macroblock processed by the sorting unit before a formerly processed macroblock, and
the specific first data is inputted from the inverse prediction unit to the first processing unit.

6. The image processor according to claim 1, wherein
inverse prediction of the first data requires information on the orientation of prediction of the first data,
the sorting unit further including a fourth processing unit obtaining the orientation of prediction of the first data.

7. The image processor according to claim 6, wherein
inverse prediction of the first data requires specific first data within a macroblock formerly processed by the sorting unit,
the sorting unit further including a memory unit for storing the specific first data.

8. The image processor according to claim 7, wherein
inverse prediction of the first data requires specific first data within a macroblock processed by the sorting unit before the formerly processed macroblock, and
the specific first data is inputted from the inverse prediction unit to the first processing unit.

9. The image processor according to claim 6, wherein
inverse prediction of the first data requires specific first data within a macroblock processed by the sorting unit before a formerly processed macroblock, and
the specific first data is inputted from the inverse prediction unit to the first processing unit.

10. The image processor according to claim 1, wherein
inverse prediction of the first data requires specific first data within a macroblock formerly processed by the sorting unit,
the sorting unit further including a memory unit for storing the specific first data.

11. The image processor according to claim 10, wherein
inverse prediction of the first data requires specific first data within a macroblock processed by the sorting unit before the formerly processed macroblock, and
the specific first data is inputted from the inverse prediction unit to the first processing unit.

12. The image processor according to claim 1, wherein
inverse prediction of the first data requires specific first data within a macroblock processed by the sorting unit before a formerly processed macroblock, and
the specific first data is inputted from the inverse prediction unit to the first processing unit.

13. An image processor comprising:
a decoding unit decoding first data of first frequency component and second data of second frequency component included in a data stream, the second data including a plurality of second data sets;
a first sorting unit sorting the plurality of second data sets having been processed by the decoding unit, employing a first table indicating frequency of appearance of non-zero data corresponding to a first orientation of prediction;
a second sorting unit sorting the plurality of second data sets having been processed by the decoding unit, employing a second table indicating frequency of appearance of nonzero data corresponding to a second orientation of prediction, concurrently with processing by the first sorting unit; and
an inverse prediction unit performing inverse prediction on the first and second data, wherein
an orientation of prediction of the second data is obtained by inverse prediction on the first data by the inverse prediction unit,
one of the first and second sorting units is selected based on the orientation of prediction of the second data, and
the second data processed by a selected one of the first and second sorting units is inputted to the inverse prediction unit.

14. The image processor according to claim 13, wherein
the decoding unit is notified of information on the orientation of prediction of the second data obtained by the inverse prediction unit, and based on the information, determines a start position of decoding of a subsequent macroblock in the data stream.

* * * * *